United States Patent Office 3,022,606
Patented Feb. 27, 1962

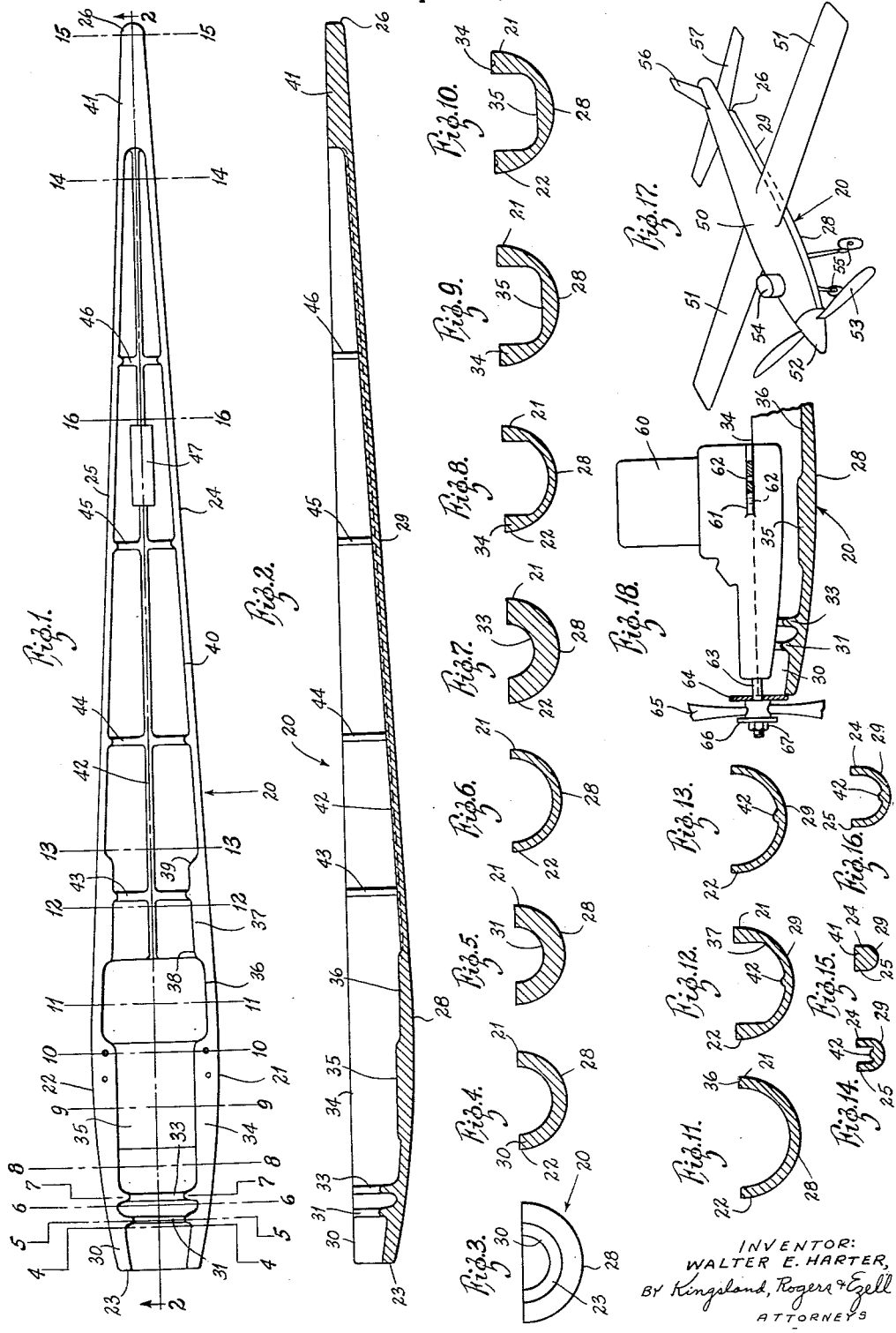

3,022,606
MODEL AIRPLANE VARIABLE-SIZE PAN
Walter E. Harter, Belleville, Ill., assignor to Harter's Hobby Products, Inc., Belleville, Ill., a corporation of Illinois
Filed Apr. 17, 1959, Ser. No. 807,225
4 Claims. (Cl. 46—76)

This invention relates to model airplane construction, in general, and particularly involves a speed pan for a model airplane.

The construction of model airplanes is a unique art within its field of items for the hobbyist, and yet there are a vast number of model airplanes available on the market. Although the model airplane may be designed for a number of user purposes, the construction of one type of model airplane is directed exclusively toward optimum configuration for maximum speed. The hobbyist may find a number of uses and pleasures with the high speed model airplane, a common example being the well-known rat races, during which keenly competitive airplane runs are made by each competitor in an effort to establish a maximum speed relative to the other contestants, and to the official record which may have been set.

High speed model airplanes are available in a number of different sizes. One problem which the manufacturer of such airplanes encounters is the competitive necessity to provide for the purchasing public a full line of model airplanes ranging from the smallest to the largest, while yet producing such airplanes at the lowest possible manufacturing cost. The solution to such a problem becomes particularly important when the manufacturer has developed a model airplane design of unusually high speed characteristics. This invention is directed toward a speed pan for attachment to the fuselage of a model airplane. The speed pan is so designed that it may be readily adapted for use with any size model airplane. Therefore, it is an object of the present invention to provide such a speed pan.

Particularly, it is an object of the invention to provide a speed pan which is extremely light and which is designed for a minimum of air resistance.

A further, and a highly important, object of the invention is to provide a speed pan which has such design characteristics that one end of it may be cut off according to the size of the airplane with which the speed pan is to be used.

Another object of the invention is to provide a speed pan which can be adapted to different length model airplane fuselages using different length motor shafts, with or without a spinner.

Another object of the invention is to provide a speed pan which is extremely strong in construction while yet being light enough for use in a high speed model airplane.

Yet another object of the invention is to provide a speed pan for a model airplane fuselage which is extremely light in weight, but to which a landing gear, wings and motor may be attached.

Another object of the invention is the provision of a speed pan which may be die cast rather than sand cast, thereby eliminating the necessity of machining.

Other objects and advantages will become apparent from the description which is to follow.

In the drawings:
FIGURE 1 is a plan view of the speed pan;
FIGURE 2 is a view in section taken along the line 2—2 of FIGURE 1;
FIGURE 3 is an end view in elevation of the speed pan taken from the left of FIGURE 1;
FIGURE 4 is a view in section taken along the line 4—4 of FIGURE 1;
FIGURE 5 is a view in section taken along the line 5—5 of FIGURE 1;
FIGURE 6 is a view in section taken along the line 6—6 of FIGURE 1;
FIGURE 7 is a view in section taken along the line 7—7 of FIGURE 1;
FIGURE 8 is a view in section taken along the line 8—8 of FIGURE 1;
FIGURE 9 is a view in section taken along the line 9—9 of FIGURE 1;
FIGURE 10 is a view in section taken along the line 10—10 of FIGURE 1;
FIGURE 11 is a view in section taken along the line 11—11 of FIGURE 1;
FIGURE 12 is a view in section taken along the line 12—12 of FIGURE 1;
FIGURE 13 is a view in section taken along the line 13—13 of FIGURE 1;
FIGURE 14 is a view in section taken along the line 14—14 of FIGURE 1;
FIGURE 15 is a view in section taken along the line 15—15 of FIGURE 1;
FIGURE 16 is a view in section taken along the line 16—16 of FIGURE 1;
FIGURE 17 is a diagrammatic perspective view of a spinner-type model airplane incorporating the speed pan which is embodied by this invention; and
FIGURE 18 is a partial view of the forward end of the speed pan, showing a motor and propeller arrangement without a spinner.

The speed pan 20 is illustrated as being an elongated member. This speed pan 20 is adapted to fit onto the under section of a model airplane fuselage. (Such a model airplane is diagrammatically illustrated in FIGURE 17.)

It can be seen from FIGURE 1 that the sides of the speed pan include opposite external forward surfaces 21 and 22 which originate at a forward end 23. The sides 21 and 22 define sweeping curves which converge toward one another at the forward end 23, and rearwardly thereof reach an area of maximum relative divergence (which may occur generally at the point where the section 10—10 is taken). As the surfaces 21 and 22 extend further rearwardly, they again gradually converge up to about the point where the section 13—13 is taken. Thereafter, the surfaces 21 and 22 continue rearwardly in relatively long sections 24 and 25, which are approximately straight, until the surfaces 21 and 22 nearly meet at the rear 26 of the speed pan. The rear 26 of the speed pan includes a small, arcuate surface as viewed in FIGURE 1, connecting the surfaces 21 and 22.

As can be seen from the various sections taken, the external surface of the speed pan 20 is generally semi-circular throughout its entire length. Thus, the lowermost surface 28 (as well as all other external surfaces) has a longitudinal configuration, as illustrated in FIGURE 2, which is the same as the configuration of the surface 21 and the surface 22. In fact, there is only one continuous external surface which is being defined in side and lower sections for ease of description. Thus, the lower surface 28 begins at the forward end 23 with a sweeping curve which becomes a generally straight line 29, terminating in the curved end 26.

The curvature of the external surface just described, which begins at the forward ends 23 and terminates in the generally straight, elongated section (24, 25 and 29) is designed with the greatest consideration of air resistance. That is to say, with the external surface configuration of the speed pan illustrated, air resistance is a minimum. This configuration permits the application of the present speed pan to extremely high speed model aircraft.

The speed pan illustrated may, for example, have a radius of 18 13/16 inches for the sweeping curve which begins at the forward surface 23. The cross-sectional diameter of the external surface at the forward end 23 may be 1 17/64 inches. The internal diameter of the forward end 23 is determined by the diameter of a propeller securing washer. In the embodiment illustrated, that internal diameter is 7/8 of an inch. (The association of the speed pan with a motor, propeller shaft and washers can be viewed at FIGURE 18.)

In order to have as light a speed pan as possible, it is desired to make the thickness as small as possible while yet preserving a very strong structure. The shell thickness of the forward section 30 of the speed pan may be uniform for a short distance, for example, the distance of 11/16 of an inch. This uniform thickness of the section 30 will, of course, require that the radius of the internal surface at section 30 be gradually increasing rearwardly from the forward end 23.

At the plane where the section 5—5 is taken on the speed pan, the radius of the internal surface sharply decreases. For example, at the plane where the section 4—4 is taken, the radius of the internal surface 30 may be 67/64 of an inch, whereas at the plane where the section 5—5 is taken, the radius may be only 7/16 of an inch. The effect of this sharp change in the interior surface of the speed pan is to present a bead 31 at the plane where the section 5—5 is taken. This bead 31 presents one plane at which the speed pan 20 may be cut transverse to its axis to adapt the speed pan to a model airplane smaller than one which might use the full length speed pan 20.

The present speed pan may be used with a model airplane which may or may not have a spinner attached to it. (In competitive flying, certain events permit the use of a spinner whereas others, such as the rat race, prohibit spinner models.) In either type it is an important, if not indispensable, feature that air flow into the forward interior of the fuselage be blocked off. For those models using a spinner, the air is automatically blocked off by the spinner, inasmuch as the size of a spinner may be chosen to completely blanket the forward opening.

For models which do not use a spinner, the size of the forward fuselage opening is determined by the diameter of the propeller-securing washers. One of those washers is fixed to the propeller shaft and is of standard diameter, regardless of the length of the propeller shaft. Since the forward internal diameter of the speed pan will be determined by the diameter of the washer, the forward internal diameter is established and must be maintained. Therefore the bead 31, having an internal diameter which is the same as the internal diameter of the forward end 23 (illustrated as being 7/8 of an inch), will cooperate with the propeller washer to block off air flow into the fuselage interior. If the cut is made immediately forward of the bead 31, the bead 31 will present a surface of the proper diameter.

A second bead 33 is rearward of the bead 31 and separated therefrom by a distance of 3/8 of an inch, measured between the planes of minimum diameter. The second bead 33 will also have an internal diameter of 7/8 of an inch. Accordingly, the speed pan 20 may have its forward end cut off immediately forward of the second bead 33, and the second bead 33 would likewise present an internal diameter of the correct size to cooperate with the propeller washer.

It should be noted that if a model airplane is to be used with a spinner, the speed pan may be cut at a bead 31 or 33 or at any other plane because the spinner applied will effectively block the flow of air into the fuselage. In fact, for spinner-type models, speed pans of the type described may be cast without the beads. Such a speed pan will still incorporate the improved air flow characteristics which are a part of this invention.

Continuing rearwardly along the speed pan 20, a section 34 has thickened side walls, as can be seen at FIGURES 1, 8, 9 and 10. The relatively wide top surface of the speed pan, above the section 34, presents a strong surface and section to which the mounting lugs of a motor may be attached. (See FIGURE 18.)

The section 34 includes a raised, flattened portion 35 on the bottom interior surface of the speed pan 20. The portion 35 may be approximately 1½ inches long with a material thickness of a quarter inch at its maximum thickness. The portion 35 presents an area where a landing gear for the model airplane may be attached. The increased thickness of the portion 35 permits the milling off of a flat plane on the under surface of the speed pan 20 adjacent the portion 35 to which the landing gear might be attached.

Rearward of the portion 35 is a section 36 of reduced thickness for conserving weight. The section 36, which may be 1½ inches long, is followed by a section 37 wherein the sides of the speed pan have an increased thickness. The section 37 may be 1¾ inches in length and have a thickness of approximately ¼ inch. It is to the top of the section 37 that the wings of the model airplane may be attached and, therefore, this section 37 is increased in thickness for added strength. The area 37 being longer than necessary to attach the wing, flexibility in the precise point of attachment is afforded. Thus the wings may be attached to the section 37 anywhere between the forward end 38 and the rearward end 39 of the section 37.

The relatively long extension 40 rearward of the section 37 has a very small thickness which may be only 3/32 of an inch. This extension 40 terminates short of the rear end 26, providing a solid section 41 between the section 40 and the rear end 26. A stabilizer may be attached to the section 41 and, since a rudder may be attached to the fuselage above the section 41, it is desirable to provide the increased strength afforded by forming the section 41 of solid construction.

Although the section 40 is very thin, it is strong because of the reinforcing skeleton provided. This reinforcement includes a longitudinal rearwardly tapering rib 42 beginning at the forward edge 38 of the section 37 and extending rearwardly therefrom to connect to the solid end section 41.

Depending from the longitudinal rib 42 are a plurality of transverse ribs 43, 44, 45 and 46, spaced as illustrated in FIGURES 1 and 2. These transverse ribs in conjunction with the longitudinal rib 42, which are all formed with the die-casting, greatly add to the strength of the present speed pan without materially increasing its weight. A flattened, enlarged portion 47 is provided intermediate the ends of the longitudinal rib 42. The portion 47 presents a surface to which the manufacturers' trademark may be stamped.

A spinner-type model airplane is illustrated in FIGURE 17, utilizing the speed pan 20 of the present invention. Such an airplane includes a fuselage 50, wings 51, a spinner 52, a propeller 53, a motor 54, a landing gear 55, a rudder 56 and a stabilizer 57. A propeller shaft connecting the propeller and spinner to the motor is not visible. It will be recognized from the flexible design of the present speed pan that a plurality of different sized airplanes may employ the speed pan 20.

FIGURE 18 illustrates a motor assembly which does not incorporate a spinner. This assembly includes the speed pan 20 (shown partially), and will include the beads 31 and 33. The motor 60 has mounting lugs 61 on either side of it. Holes 62 through these lugs permit the attachment of the lugs 61 to the upper surfaces of the section 34. The shaft 63 extending from the motor has a washer 64 fixed to it. A propeller 65 is secured to the shaft 63 between the washer 64 and another washer 66 by a nut 67 threaded onto the end of the shaft 63. The washer 64 is located just forward of the front end of the speed pan 20 and is of such a diameter that it extends slightly beyond the internal edge of the pan, thus effectively blocking the flow of air into the interior. (The fuselage will fit onto the speed pan in the manner illustrated in FIGURE 17 with the washer 64 extending beyond its internal surface also.)

As illustrated in FIGURE 18, the shaft 63 is long enough that the washer 64 is located at the front end 23 of the pan. However, it will be appreciated that for motors having shorter shafts, the pan will be cut, and the washer 64 will be positioned adjacent one of the beads 31 or 33.

One of the greatest costs in the construction of items of the type herein described is the labor cost. The present speed pan construction affords a tremendous saving in such cost. This is because the speed pan is die cast rather than sand cast for the unusual saving which will become apparent. It is true that the die is more expensive than is the cost of setting up the machinery for a sand casting. However, the present invention incorporates a unique structural arrangement permitting the use of a single die. The die produces a cast speed pan adaptable to a plurality of speed pan lengths merely by the cutting off of the forward section of the speed pan when it is to be used with a smaller aircraft. The die will be designed to cast the largest speed pan of a series, and that speed pan can be cut off for smaller applications.

It is understood that the description heretofore presented, together with the accompanying drawings are intended to be illustrative only and that, while only a single embodiment has been shown and described, the invention is not to be so limited but is meant to be defined only by the scope of the claims which follow.

What is claimed is:

1. An attachment of the type described comprising a speed pan for fitting to the lower section of a model airplane fuselage, the pan having an open forward end for permitting the passage of a propeller shaft, the pan cooperating with the fuselage to enclose a section of the shaft, the pan having its interior cut out so as to define substantially a hollow shell, the thickness of which is variable along the length of the shell, the pan being of gradually increasing size over a portion of the distance from the forward end, as measured transversely of the axis of the speed pan, with the thickness of the pan wall being maintained substantially thin to maintain as much as possible a light weight pan, the interior of the pan having a bead parallel to and spaced from the forward end, the size and shape of the innermost surface of the pan at a plane through the bead being the same as the size and shape of the internal surface at the forward end so that the pan may have its end forward of the bead cut off, and a second bead rearward of the first-mentioned bead, the size and shape of the innermost surface of the second bead being the same as that of the first bead, rendering the pan adaptable to a plurality of fuselage sizes.

2. The attachment of claim 1 wherein the pan is formed by die casting.

3. The speed pan of claim 1, wherein a thickened section is provided rearward of the forward end to permit the planar milling of the area underneath said section to facilitate the attachment of a landing gear thereto.

4. The speed pan of claim 1 including additional thickened sections to facilitate the attachment of a motor carrying the propeller and the attachment of wings to the pan.

References Cited in the file of this patent

UNITED STATES PATENTS

| | | |
|---|---|---|
| 405,057 | Taylor | June 11, 1889 |
| 2,157,097 | Jung | May 9, 1939 |
| 2,238,702 | McIntosh | Apr. 15, 1941 |
| 2,555,670 | Babcock | June 5, 1951 |
| 2,870,567 | Bergstrand | Jan. 27, 1959 |